(12) United States Patent
Ezoe

(10) Patent No.: US 9,302,704 B2
(45) Date of Patent: Apr. 5, 2016

(54) POWER STEERING CONTROLLER FOR VEHICLE

(71) Applicant: FUJI JUKOGYO KABUSHIKI KAISHA, Tokyo (JP)

(72) Inventor: Shiro Ezoe, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 112 days.

(21) Appl. No.: 13/952,394

(22) Filed: Jul. 26, 2013

(65) Prior Publication Data

US 2014/0032051 A1    Jan. 30, 2014

(30) Foreign Application Priority Data

Jul. 27, 2012    (JP) .................. 2012-167230

(51) Int. Cl.
| | |
|---|---|
| *B62D 6/00* | (2006.01) |
| *B60W 30/09* | (2012.01) |
| *B62D 15/02* | (2006.01) |
| *B60W 10/20* | (2006.01) |

(52) U.S. Cl.
CPC ............ *B62D 6/001* (2013.01); *B62D 6/007* (2013.01); *B60W 10/20* (2013.01); *B60W 30/09* (2013.01); *B62D 15/025* (2013.01)

(58) Field of Classification Search
CPC ... B60W 10/184; B60W 10/20; B60W 30/09; B60W 30/12; B60W 40/072; B60W 2420/52; B60W 2520/10; B60W 2520/14; B60W 40/076; B60W 50/10; B60W 50/14; B62D 15/025; B62D 15/0265; B62D 6/001; B62D 6/002; B62D 6/003; B62D 6/008; B62D 7/159; B62D 1/286; B62D 5/008; B62D 5/0463; B60T 8/1755; G08G 1/166; G08G 1/165; G08G 1/167
USPC .................. 701/1, 3, 31.4, 39, 41, 42, 93
See application file for complete search history.

(56) References Cited

U.S. PATENT DOCUMENTS

| | | | | |
|---|---|---|---|---|
| 2008/0059037 A1* | 3/2008 | Isaji | ............... | B60W 40/072 701/93 |
| 2009/0099728 A1* | 4/2009 | Ichinose | ............ | B62D 15/0265 701/39 |

(Continued)

FOREIGN PATENT DOCUMENTS

| | | |
|---|---|---|
| JP | 06-107194 A | 4/1994 |
| JP | 06-328987 A | 11/1994 |

(Continued)

*Primary Examiner* — James Trammell
*Assistant Examiner* — Sanjeev Malhotra
(74) *Attorney, Agent, or Firm* — McDermott Will & Emery LLP

(57) ABSTRACT

A basic assist torque is set on the basis of the vehicle speed and the steering torque, and when the vehicle changes from a straight driving state to a curve driving state, a correction amount for the basic assist torque is calculated, which is to offset steering torque characteristic values which has been predetermined depending on a steering angle, in a direction opposite to the steering direction by correcting an absolute value of the basic assist torque to reduce its action on the steering direction depending at least upon the curvature radius of the driving road in front of the vehicle, and the basic assist torque is corrected with the basic assist torque correction amount and the controlled/corrected torque (assist torque) is output to a motor drive unit.

2 Claims, 8 Drawing Sheets

(56) References Cited

U.S. PATENT DOCUMENTS

| | | | | |
|---|---|---|---|---|
| 2009/0216405 | A1* | 8/2009 | Kudo | B62D 15/025 701/41 |
| 2009/0326761 | A1* | 12/2009 | Nitta | B60T 8/1755 701/41 |
| 2010/0030426 | A1* | 2/2010 | Okita | B60T 7/22 701/41 |
| 2010/0274435 | A1* | 10/2010 | Kondoh | B60W 40/09 701/31.4 |
| 2012/0083947 | A1* | 4/2012 | Anderson | B60W 30/09 701/3 |
| 2012/0123643 | A1* | 5/2012 | Limpibuntering | B62D 1/286 701/42 |
| 2012/0226417 | A1* | 9/2012 | Nishikawa | B60T 8/1755 701/42 |
| 2012/0239252 | A1* | 9/2012 | Sawada | B62D 15/0265 701/41 |
| 2012/0271483 | A1* | 10/2012 | Samukawa | B60W 50/14 701/1 |

FOREIGN PATENT DOCUMENTS

| | | |
|---|---|---|
| JP | 2001-063604 A | 3/2001 |
| JP | 2001-106104 A | 4/2001 |
| JP | 2004-098841 A | 4/2004 |
| JP | 2005-081986 A | 3/2005 |
| JP | 2008-044531 A | 2/2008 |
| JP | 2008-230506 A | 10/2008 |
| JP | 2009-040092 A | 2/2009 |
| JP | 2011-005949 A | 1/2011 |

* cited by examiner

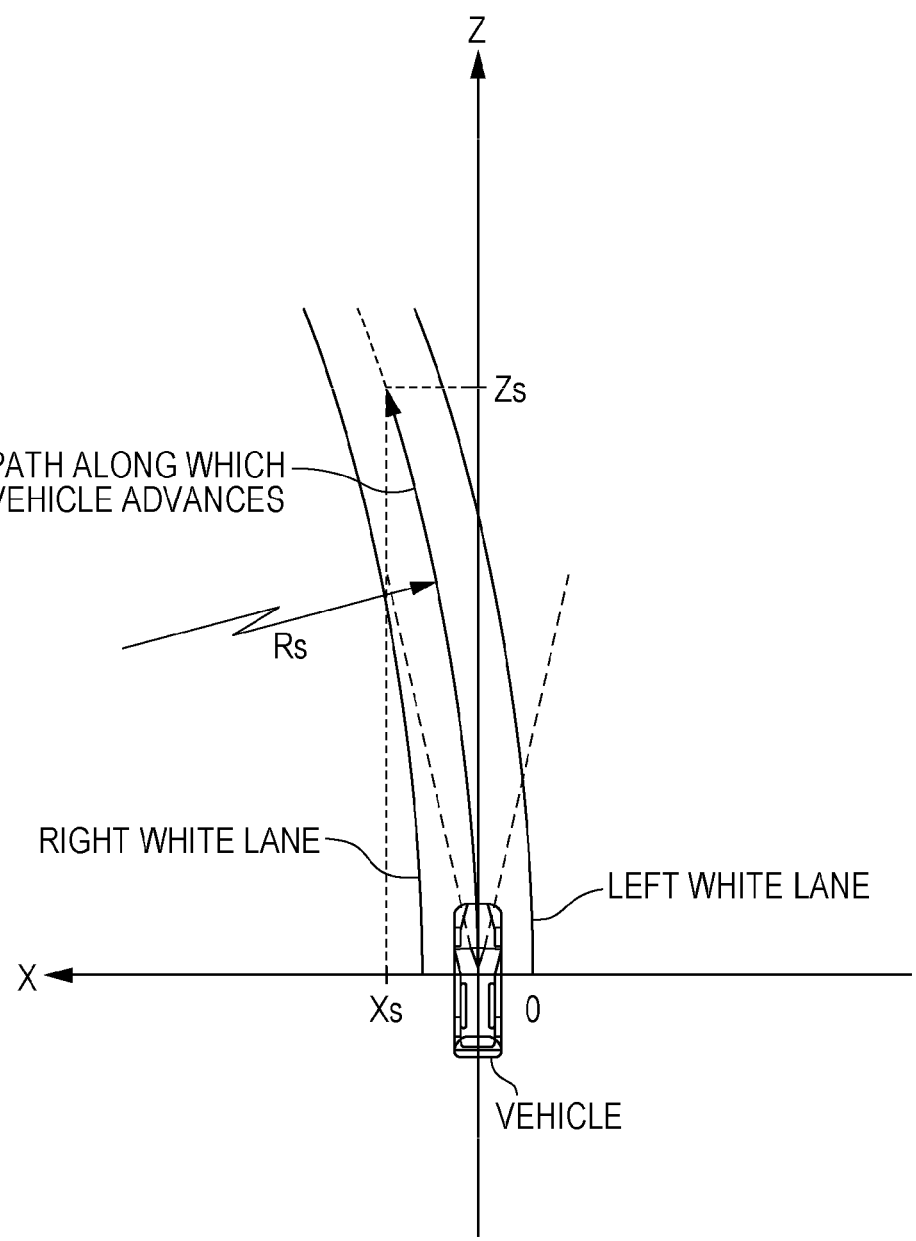

POWER STEERING CONTROLLER FOR VEHICLE

CROSS-REFERENCE TO RELATED APPLICATIONS

The present application claims priority from Japanese Patent Application No. 2012-167230 filed on Jul. 27, 2012, the entire contents of which are hereby incorporated by reference.

BACKGROUND OF THE INVENTION

1. Field of the Invention

The present invention particularly relates to a power steering controller for a vehicle that achieves an appropriate steering feel at an entrance to a curve.

2. Description of the Related Art

For a vehicle, steering support devices for providing steering support by generating steering torque in various manners with a power steering motor have been suggested and put into practice. For example, Japanese Unexamined Patent Application Publication (JP-A) No. 2008-44531 discloses a technique of a steering support device which calculates a steering target value on the basis of the shape of a driving road on which a vehicle runs, and provides steering support in accordance with the steering target value, and a determination is made as to whether the vehicle runs at an entrance to a curve of the driving road. When the vehicle is determined to be running at the entrance to the curve, the steering support device increases the steering target value, and suppresses delay of additionally turning the steering wheel at the entrance to the curve, as compared with a case where the vehicle runs at a place other than the entrance to the curve.

In general, in a vehicle steering system, there is a dead zone between an actual wheels angle and a steering wheel angle of the steering wheel when the steering wheel is around the central position because of friction and the like that are set in view of reverse input, vibration, and the like which are given by the tires or the configuration of mechanical parts between the steering wheel and the steered wheels. In the dead zone, the position where the steering wheel angle based on the steering wheel actually exists may change relatively due to disturbance and the like given by the road surface, and therefore, the driver cannot recognize the actual position until the driver starts steering. For example, when the driver turns the steering wheel to the left by a certain angle to make a left turn, the driver may feel the response during steering is not enough and tends to turn the steering wheel too much if the steering wheel angle of the steering wheel exists at the right side of the dead zone. As described above, when the driver turns the steering wheel too much, it is necessary to relieve the force in the opposite direction in order to correct the steering angle. In contrast, when the steering wheel angle based on the steering wheel exists at the left side of the dead zone, the driver tends to turn the steering wheel insufficiently during steering on the contrary. In order to improve the problem of the difference in the steering feel due to the dead zone existing in such steering system, the rigidity of the joint may be improved, and the gear meshing backlash may be reduced, but this is trade-off for performance of the steering system such as vibration and noise. It may be possible to add, e.g., steering returning control, but this may cause a new problem such as ensuring continuity of change of steering force during steering over the central position. The steering support control disclosed in JP-A No. 2008-44531 explained above is to suppress the delay of additionally turning the steering wheel at the entrance to a curve in the lane keep control, and is unable to solve awkwardness in the steering feel caused by the existence of the dead zone of the steering system at the entrance to the curve as described above.

BRIEF SUMMARY OF THE INVENTION

The present invention is made in view of the above circumstances, and it is an object of the present invention to provide a power steering controller for a vehicle that allows a driver to, e.g., correct the steering angle with less awkwardness in such a manner that the driver feels the same feeling no matter in which direction the driver turns the steering wheel, particularly at the entrance to a curve, while the power steering controller does not require additional complicated mechanisms and controls.

An aspect of the present invention provides a power steering controller for a vehicle including: a basic assist torque setting unit to set an assist torque of a steering torque as a basic assist torque in accordance with a driving state of the vehicle; a driving road shape recognizing unit to recognize a shape of a driving road in front of the vehicle; an assist torque correction unit to offset a steering torque characteristic value, which has been predetermined depending on a steering angle, in a direction opposite to the steering direction by correcting an absolute value of the basic assist torque to reduce its action on the steering direction depending at least upon the curvature radius of the driving road in front of the vehicle at the transition from a straight travel state to the curving travel state; and, a steering control unit to drive and control an actuator that assists a steering torque with the corrected basic assist torque.

BRIEF DESCRIPTION OF THE SEVERAL VIEWS OF THE DRAWINGS

FIG. 6 is an explanatory diagram illustrating curve radius calculation according to the embodiment of the present invention;

FIG. 7A illustrates an example of a left curve which is turning ahead of a vehicle, FIG. 7B illustrates an example of 1/R calculated, FIG. 7C illustrates an example of steering speed calculated, and FIG. 7D illustrates an example of basic assist torque correction amount calculated;

DETAILED DESCRIPTION OF THE INVENTION

Hereinafter, an embodiment of the present invention will be described with reference to the drawings.

Figure 1:
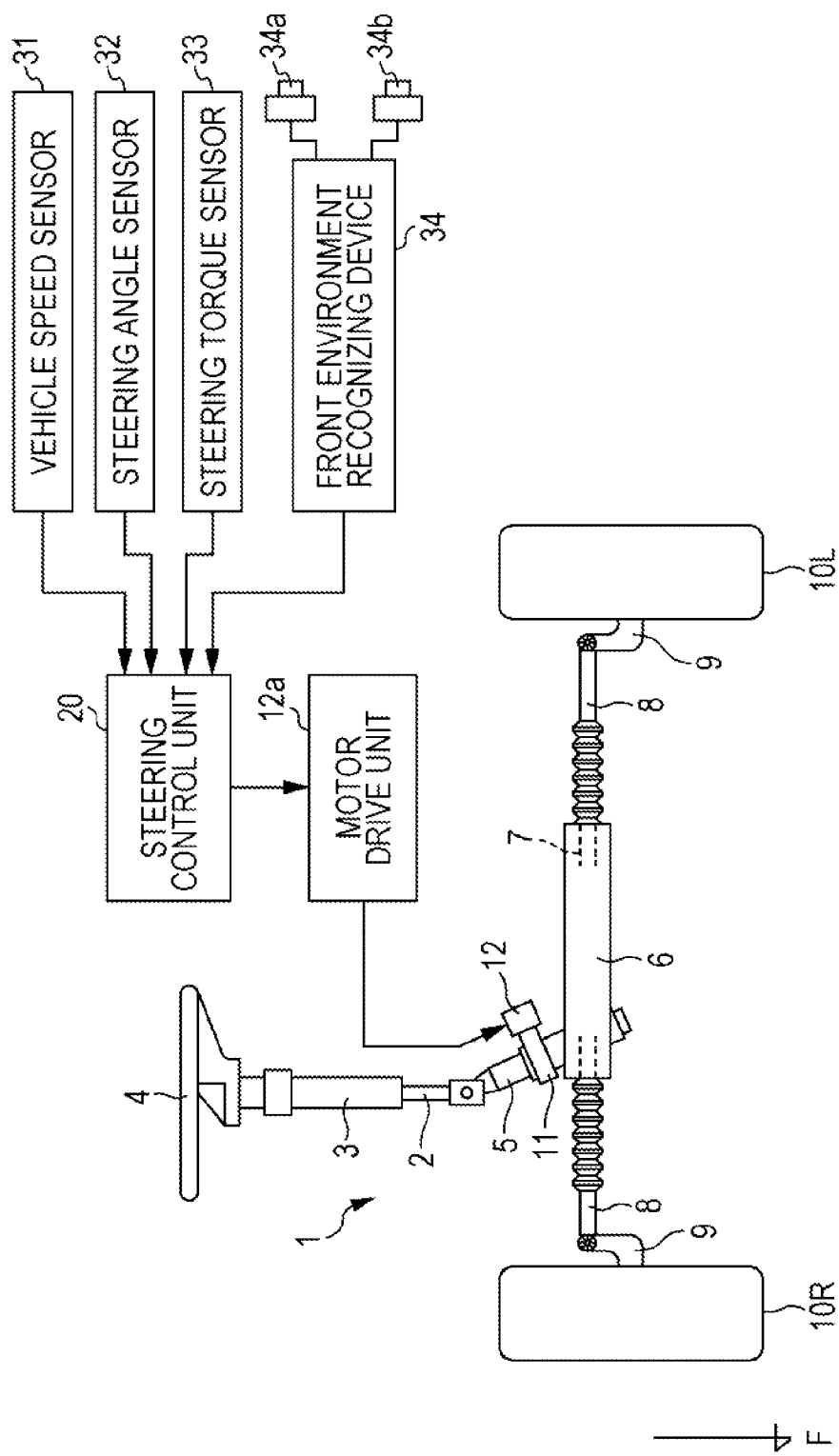
FIG. 1 is a configuration explanatory diagram illustrating a steering system of a vehicle according to an embodiment of the present invention.

In FIG. 1, reference numeral 1 denotes an electric power steering device, the electric power steering device 1 is configured such that a steering shaft 2 is rotatably supported via a steering column 3 by a vehicle frame, not shown, and one end of the steering shaft 2 extends to a driver's seat, and the other end thereof extends to an engine room. A steering wheel 4 is fixed to an end portion of the steering shaft 2 at the driver's seat. A pinion shaft 5 is connected to the other end portion thereof extending to the engine room side.

In the engine room, a steering gear box 6 extending in vehicle widthwise direction is provided, and rack shafts 7 are inserted and supported in this steering gear box 6 in a reciprocally movable manner. A pinion (not shown) formed at the pinion shaft 5 is engaged with a rack (not shown) formed on the rack shaft 7, which makes a rack and pinion-type steering gear mechanism.

Both right and left ends of the rack shaft 7 protrude from the end portions of the steering gear box 6, and a front knuckle 9 is connected to the end portion via a tie rod 8. The front knuckles 9 rotatably support right and left wheels 10L, 10R which serve as steered wheels, and are supported by the vehicle frame via king pins (not shown) in such a manner as to allow steering.

Accordingly, when the driver operates the steering wheel 4 to rotate the steering shaft 2 and the pinion shaft 5, the rack shaft 7 moves in the right or left direction according to the rotation of the pinion shaft 5, and this movement makes the front knuckle 9 to pivot about the kingpin (not shown), whereby the right and left wheels 10L, 10R are steered in the right or left direction.

An electric motor 12 is connected to the pinion shaft 5 via an assist transmission mechanism 11, and the electric motor 12 assists the steering torque applied to the steering wheel 4. The electric motor 12 is driven and controlled via a motor drive unit 12a with a control amount (in the present embodiment, assist torque Ta) that is set by a steering control unit 20 explained later. The control amount may be an electric current value corresponding to the assist torque Ta.

The steering control unit 20 is connected to a vehicle speed sensor 31 for detecting a vehicle speed V, a steering angle sensor 32 for detecting a steering angle $\delta H$, a steering torque sensor 33 for detecting the steering torque Ts applied to the steering wheel 4, and a front environment recognizing device 34 serving as a driving road shape recognizing unit for recognizing the shape of the driving road in front of the vehicle by processing image information given by a stereo camera unit.

The stereo camera unit includes a pair of (right and left) cameras 34a and 34b using solid-state image sensing devices, and the cameras 34a and 34b are attached with a certain base length therebetween at the front portion of a ceiling of a cabin. The cameras 34a and 34b capture images of a target outside of the vehicle from different view points, and output image data to the front environment recognizing device 34.

The front environment recognizing device 34 has an image processing engine that processes images captured by the stereo camera unit at a high speed, and is configured as a processing unit that performs recognition processing based on an output result of the image processing engine and driving information about the vehicle (driving information about, e.g., a vehicle speed V of the vehicle). The image processing of the stereo camera unit by this front environment recognizing device 34 is done, for example, as follows.

More specifically, first, the front environment recognizing device 34 obtains distance information from a deviation amount of the corresponding positions of a pair of stereo images, captured by the stereo camera unit, in the advancing direction of the vehicle, so as to produce a distance image. Then, a known grouping process is done based upon the data, and the data are compared with frames (windows) of three-dimensional road-configuration data, side-wall data, three-dimensional-object data, and the like, which are stored in advance. With this process, white-line data, and side-wall data such as a guard rail or a curb present along the road is extracted, and the three-dimensional objects are extracted by classifying the three-dimensional objects into types such as vehicles, pedestrians crossing the road, and other three-dimensional objects. As illustrated in FIG. 6, these pieces of data are calculated as data on a coordinate system on the basis of the vehicle in which the vehicle is defined as an origin, the longitudinal direction of the vehicle is defined as a Z axis, and the widthwise direction of the vehicle is defined as an X axis. In the coordinate system, the white-line data, the sidewall data such as the guard rail or the curb present along the road, the type of the three-dimensional object, the distance between the vehicle and the three-dimensional object, the speed (time differential value of the distance+vehicle speed V), the acceleration (time differential value of speed), the central position, both end positions, and the like are output as three-dimensional object information to the steering control unit 20. In this case, with respect to the road shape, for example, a curve (or a straight line) continuing in a central portion between a left white line and a right white line is estimated as a driving road in front of the vehicle, and it is output to the steering control unit 20. In the present embodiment, the shape of the driving road in front of the vehicle is recognized based on image information given by the stereo camera unit. Alternatively, it is to be understood that the present embodiment can also be applied to a vehicle driving support device that performs recognition based on image information given by such as a single camera and a color camera, and such camera may be used in combination with other recognition sensors such as a milliwave radar and inter-vehicle communication. Alternatively, the recognition may be performed on the basis of road shapes based on map information obtained from a publicly-known navigation device, guided path information formed by a navigation device, and map information provided by infrastructure.

The steering control unit 20 sets a basic assist torque Tb on the basis of the vehicle speed V and the steering torque Ts, and when the vehicle changes from a straight driving state to a curve driving state, the steering control unit 20 is configured to calculate a correction amount $\Delta Ta$ for the basic assist torque for offsetting the characteristics of the steering torque Is with respect to the steering angle $\delta H$ in a direction opposite to the steering direction by making correction in a direction to reduce the absolute value |Tb| of the basic assist torque for the steering direction on the basis of a curve radius R of the driving road in front of the vehicle and the steering speed ($d\delta H/dt$), and correct the basic assist torque Tb with the basic assist torque correction amount $\Delta Ta$ and output a control amount (assist torque Ta) to the motor drive unit 12a. In an embodiment of the present invention, for example, the left turn direction is denoted as symbol (+), and the right turn direction is denoted as symbol (−), and although not explained below, the control is performed at all times in view of these both directions.

Figure 2:
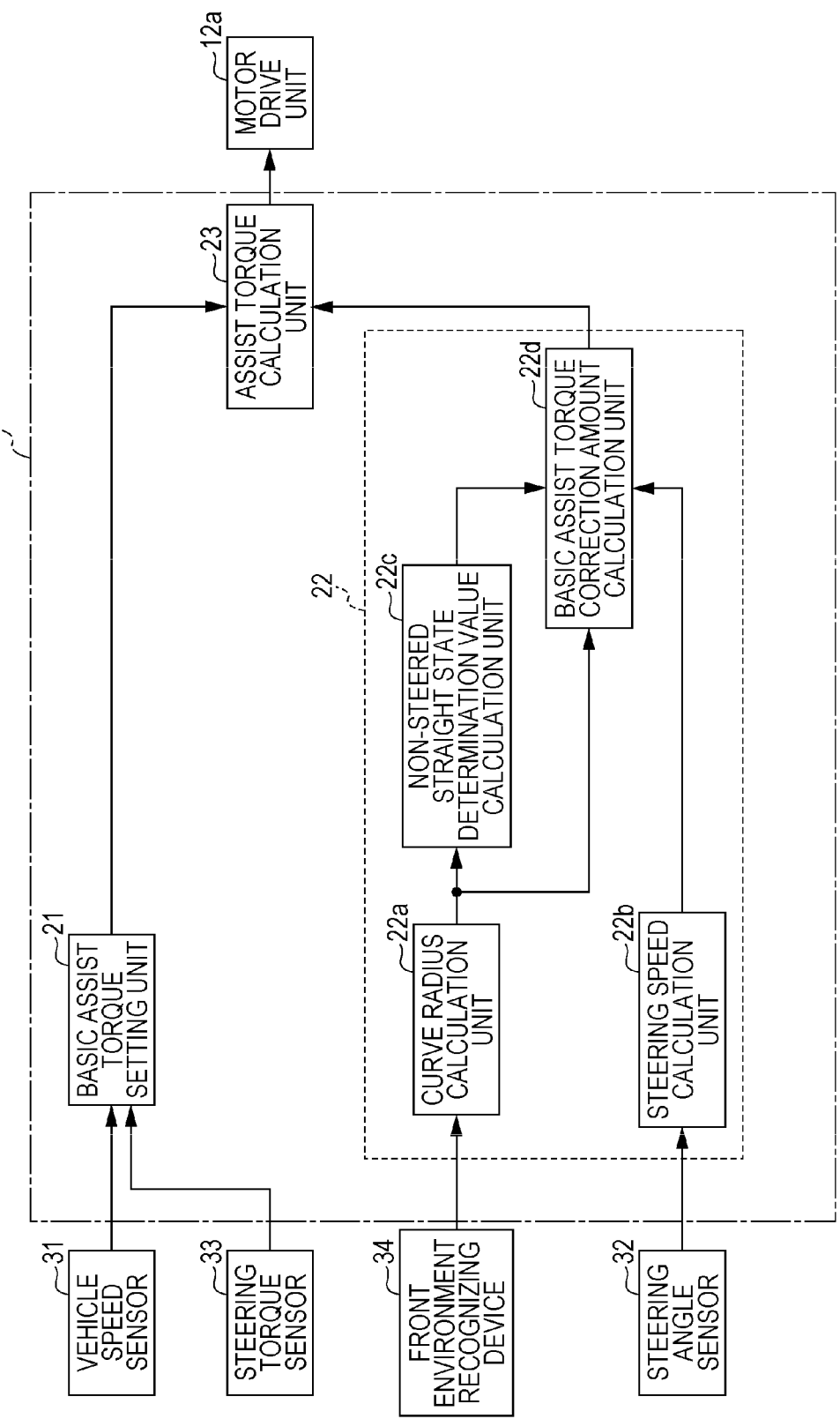
FIG. 2 is a functional block diagram illustrating a steering control unit according to the embodiment of the present invention.

Accordingly, as illustrated in FIG. 2, the steering control unit 20 mainly includes a basic assist torque setting unit 21, a basic assist torque correction amount setting unit 22, and an assist torque calculation unit 23.

Figure 5:
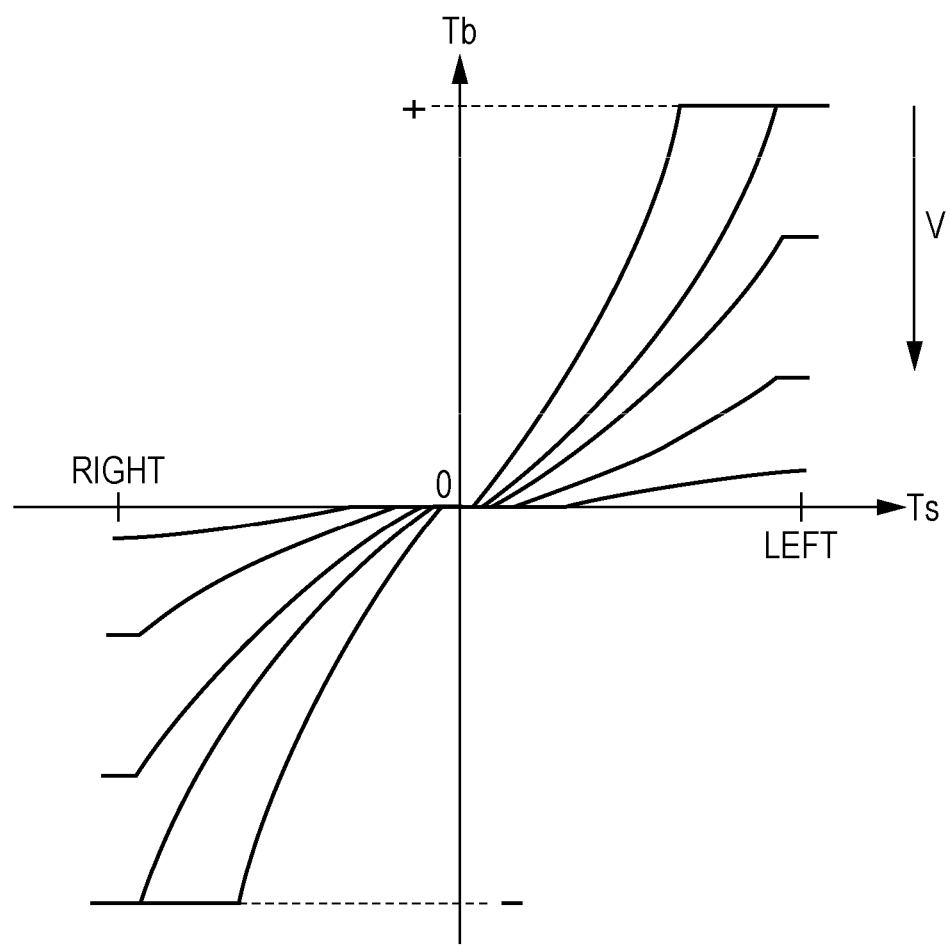
FIG. 5 is an explanatory view illustrating an example of characteristics of a basic assist torque according to the embodiment of the present invention.

The basic assist torque setting unit 21 receives the vehicle speed V from the vehicle speed sensor 31, and receives the steering torque Is from the steering torque sensor 33. Then, for example, as illustrated in FIG. 5, a map that is set in advance through experiment, calculation or the like is looked up, and the basic assist torque Tb is set on the basis of the vehicle speed V and the steering torque Ts, and is output to the assist torque calculation unit 23. The above setting of the basic assist torque Tb is an example. The setting may be made using publicly known maps/calculation expressions based on other parameters and maps/calculation expressions of which characteristics are different. As described above, the basic assist torque setting unit 21 is provided as a basic assist torque setting unit.

The basic assist torque correction amount setting unit 22 determines a transition from a straight driving state to a curve driving state on the basis of the curve radius R of the driving road in front of the vehicle. When the vehicle is determined to change from the straight driving state to the curve driving state, the basic assist torque correction amount setting unit 22 calculates a correction amount ΔTa for the basic assist torque for offsetting the characteristics of the steering torque Ts with respect to the steering angle δH in a direction opposite to the steering direction by making correction in a direction to reduce the absolute value |Tb| of the basic assist torque for the steering direction on the basis of a curve radius R of the driving road in front of the vehicle and the steering speed (dδH/dt), and mainly includes a curve radius calculation unit 22a, a steering speed calculation unit 22b, a non-steered straight state determination value calculation unit 22c, and a basic assist torque correction amount calculation unit 22d.

The curve radius calculation unit 22a receives the recognized coordinate position of the driving road from the front environment recognizing device 34. Then, a curve radius Rs at a front attention distance (vehicle speed V·configured time) Zs is calculated and output to the non-steered straight state determination value calculation unit 22c and the basic assist torque correction amount calculation unit 22d. At this occasion, as illustrated in FIG. 6, the curve radius Rs at the front attention distance (vehicle speed V·configured time) Zs is, for example, calculated by the following expression (1), where the coordinate at the preconfigured distance Zs on the driving road in front of the vehicle is denoted as (Xs, Zs).

$$Rs = (Xs^2 + Zs^2)/(2 \cdot Xs) \quad (1)$$

The steering speed calculation unit 22b receives the steering angle δH from the steering angle sensor 32, calculates the steering speed (dδH/dt) by differentiating the steering angle δH, and outputs the steering speed (dδH/dt) to the basic assist torque correction amount calculation unit 22d.

The non-steered straight state determination value calculation unit 22c receives the curve radius Rs from the curve radius calculation unit 22a. Then, for example, (1/Rs) is subjected to filter processing with a lowpass filter having a predetermined time constant for removing noise and error and is further subjected to absolute value processing and the like, and a non-steered straight state determination value Dj is calculated and output to the basic assist torque correction amount calculation unit 22d.

The basic assist torque correction amount calculation unit 22d receives the curve radius Rs from the curve radius calculation unit 22a, receives the steering speed (dδH/dt) from the steering speed calculation unit 22b, and receives the non-steered straight state determination value Dj from the non-steered straight state determination value calculation unit 22c. Then, the correction amount ΔTa for the basic assist torque is calculated as follows, and is output to the assist torque calculation unit 23. More specifically, a first calculation value x1 is calculated by the following expression (2).

$$x1 = |K1 \cdot (1/R)| - |K2 \cdot (d\delta H/dt)| \quad (2)$$

In this case, K1 and K2 are constants that are set in advance.

Then, saturation function processing according to the following expressions (3), (4) and (5) is executed on the first calculation value x1, and a second calculation value x2 is obtained.

$$x1 \geq Ct1:x2 = Ct1 \quad (3)$$

$$x1 \leq 0:x2 = 0 \quad (4)$$

$$x1 \text{ is other than the above}:x2 = x1 \quad (5)$$

In this case, Ct1 is a constant that are set in advance through experiment, calculation, and the like.

On the other hand, reference numeral processing according to the following expressions (6), (7) and (8) is performed on the basis of (1/Rs), and a third calculation value x3 representing a curve direction is calculated.

$$\text{SIGN}(1/Rs) > 0:x3 = +1 \quad (6)$$

$$\text{SIGN}(1/Rs) < 0:x3 = -1 \quad (7)$$

$$1/Rs = 0:x3 = 0 \quad (8)$$

In this case, SIGN (1/Rs) denotes a sign of 1/Rs.

A fourth calculation value x4 (=x2·x3) is calculated by multiplying the second calculation value x2 by the third calculation value x3.

Then, in accordance with the non-steered straight state determination value Dj, the correction amount ΔTa for the basic assist torque is set by the following expressions (9) and (10).

$$Dj \leq Ct2 \text{(straight state before steering)}: \Delta Ta = x4 \quad (9)$$

$$Dj > Ct2 \text{(a case that cannot be deemed as straight state before steering)}: \Delta Ta = 0 \quad (10)$$

In this case, Ct2 is a constant that are set in advance through experiment, calculation, and the like.

More specifically, when the vehicle changes from the straight driving state to the curve driving state, the correction amount ΔTa for the basic assist torque is to offset the characteristics of the steering torque Is with respect to the steering angle δH in a direction opposite to the steering direction by making correction in a direction to reduce the absolute value |Tb| of the basic assist torque for the steering direction, and therefore, as shown in the expression (2), the first calculation value x1 is calculated upon subtracting an operation term |K·(dδH/dt)| indicating that the vehicle is being steered.

This control is to offset the characteristics of the steering torque Is with respect to the steering angle δH in a direction opposite to the steering direction using the control in the dead zone width at around the central position of the steering characteristics, and therefore, a reduced value is obtained as represented by the second calculation value x2 calculated by the saturation functions according to the expressions (3), (4) and (5).

The assist torque calculation unit 23 receives the basic assist torque Tb from the basic assist torque setting unit 21, and receives the basic assist torque correction amount ΔTa from the basic assist torque correction amount calculation unit 22d of the basic assist torque correction amount setting unit 22. Then, for example, according to the following expression (11), the basic assist torque Tb is corrected with the basic assist torque correction amount ΔTa, and the result is output to the motor drive unit 12a as the control amount (assist torque Ta).

$$Ta = Tb + \Delta Ta \quad (11)$$

As described above, the basic assist torque correction amount setting unit 22 is provided with the function of the assist torque correction unit, and the assist torque calculation unit 23 is provided with the functions of the assist torque correction unit and the steering control unit.

Figure 3:
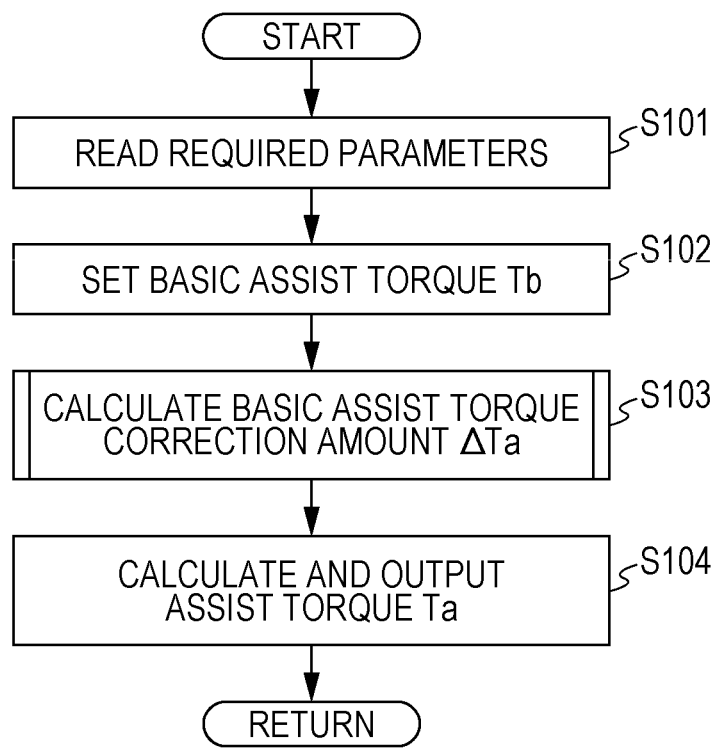
FIG. 3 is a flowchart illustrating a power steering control program according to the embodiment of the present invention.

Subsequently, the power steering control executed by the steering control unit 20 will be explained with reference to the flowchart of FIGS. 3, 4.

First, required parameters, i.e., the vehicle speed V, steering angle δH, the steering torque Ts, the coordinate of the driving road shape in front of the vehicle, and the like, are read in step (hereinafter abbreviated as "S") 101.

Subsequently, S102 is performed, in which the basic assist torque setting unit 21 looks up the preconfigured map (for example, as illustrated in FIG. 5) as described above, and sets the basic assist torque Tb on the basis of the vehicle speed V and the steering torque Ts.

Subsequently, S103 is performed, in which the basic assist torque correction amount setting unit 22 calculates the basic assist torque correction amount ΔTa in accordance with the flowchart of FIG. 4 explained below.

Then, S104 is performed, in which the assist torque calculation unit 23 calculates the assist torque Ta according to the expression (11) explained above, and outputs the assist torque Ta to the motor drive unit 12a. Then, the program is terminated.

Figure 4:
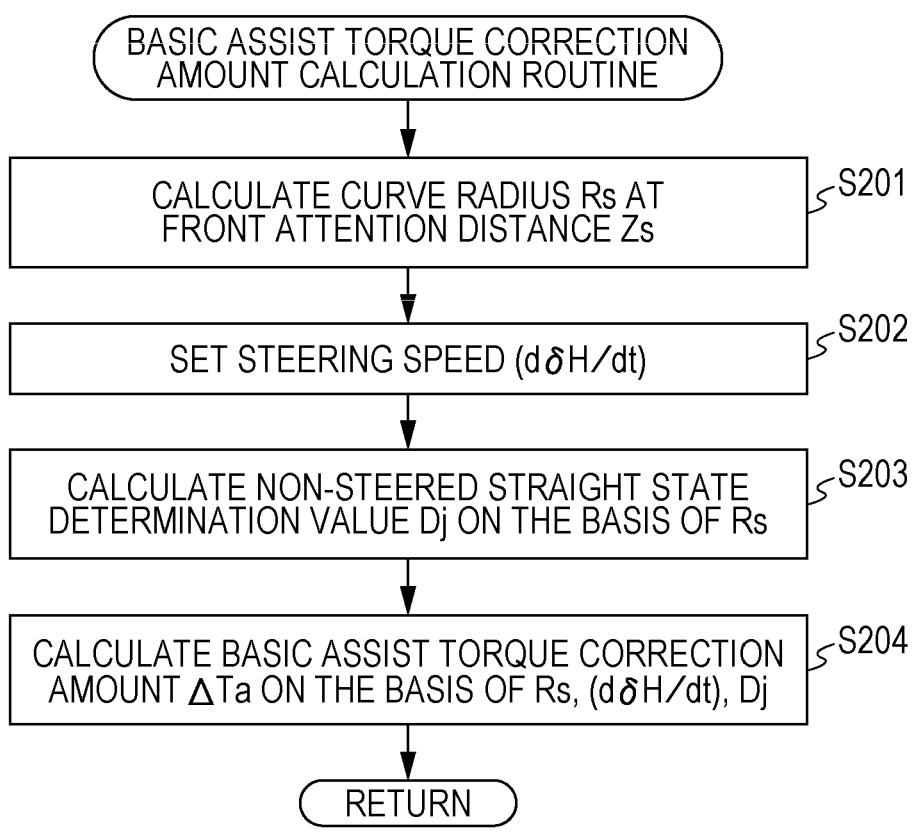
FIG. 4 is a flowchart illustrating a basic assist torque correction amount calculation routine according to the embodiment of the present invention.

In the calculation of the basic assist torque correction amount ΔTa executed in S103 explained above, first, in S201, as illustrated in the flowchart of FIG. 4, the curve radius calculation unit 22a of the basic assist torque correction amount setting unit 22 calculates the curve radius Rs at the front attention distance Zs according to the expression (1) explained above.

Subsequently, S202 is performed, in which the steering speed calculation unit 22b calculates the steering speed (dδH/dt) by differentiating the steering angle δH.

Subsequently, S203 is performed, in which the non-steered straight state determination value calculation unit 22c performs filter processing on (1/Rs) with a lowpass filter having a predetermined time constant for removing noise and error and further performs the absolute value processing and the like, whereby the non-steered straight state determination value Dj is calculated.

Then, S204 is performed, in which the basic assist torque correction amount calculation unit 22d calculates the correction amount ΔTa for the basic assist torque according to the expressions (2) to (10) explained above, and the program is terminated.

As described above, according to the embodiment of the present invention, a basic assist torque Tb is set on the basis of the vehicle speed V and the steering torque Ts. Further, a basic assist torque correction amount ΔTa for offsetting characteristic values of the steering torque Is (which have been predetermined depending on the steering angle δH in a direction opposite to the steering direction is calculated. The offset/correction is attained at the transition from a straight travel state to a curving driving state, by correcting the absolute value |Tb| of the basic assist torque working in the stirring direction so as to decrease, depending on the curvature radius R of the driving road in front of the vehicle and the steering speed (dδH/dt). Then, the basic assist torque Tb is corrected with the basic assist torque correction amount ΔTa and the controlled/corrected torque (assist torque Ta) is output to the motor drive unit 12a. Therefore, in particular, the driver can correct the steering angle with less awkwardness in such a manner that the driver feels the same feeling no matter in which direction the driver turns the steering wheel at the entrance to a curve while the power steering controller does not require additional complicated mechanisms and controls.

Figure 7A:
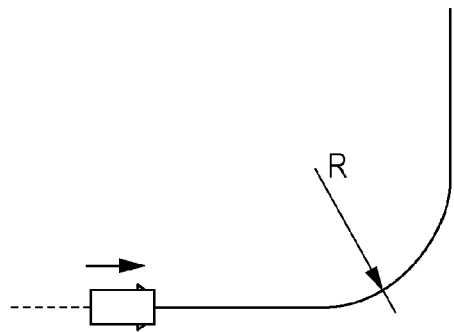
FIGS. 7A to 7D are explanatory diagrams illustrating basic assist torque correction amount calculation according to the embodiment of the present invention.
Figure 7B:
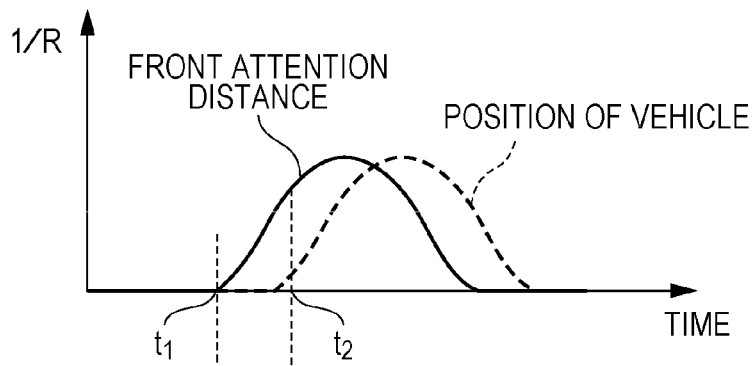
Figure 7C:
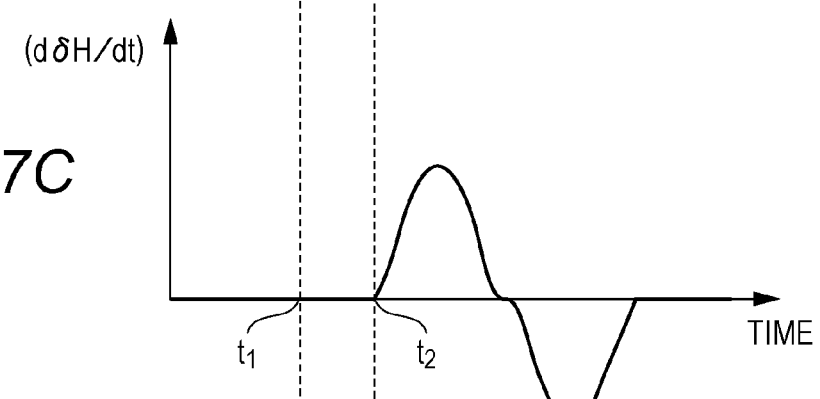
Figure 7D:
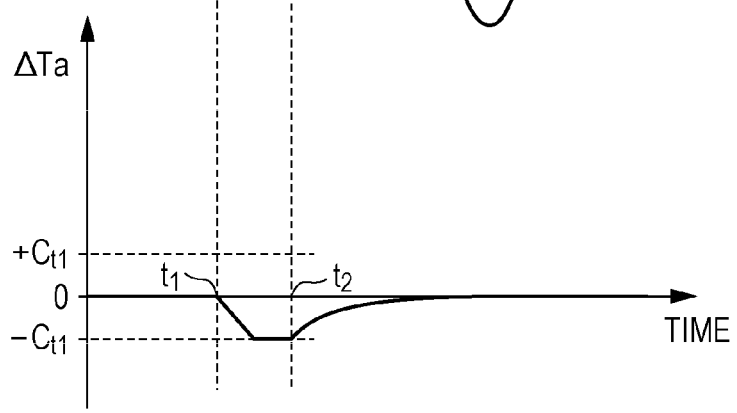

An example of calculation of the basic assist torque correction amount ΔTa according to the embodiment of the present invention will be explained with reference to FIGS. 7A to 7D. For example, when the vehicle drives along the straight path and then turns left as illustrated in FIG. 7A, a reciprocal number (1/R) of the curve radius R at this occasion is as shown in FIG. 7B. In this case, (1/R) at the front attention distance Zs is what is indicated by a solid line, and (1/R) at the position of the vehicle is what is indicated by a broken line. The steering speed (dδH/dt) at this occasion is calculated as illustrated in FIG. 7C. Then, the correction amount ΔTa for the basic assist torque based on the reciprocal number (1/R) of the curve radius R and the steering speed (dδH/dt) is particularly limited to a value between 0 and Ct1 due to the saturation function processing according to the expressions (3), (4) and (5) explained above, and further, the reference numeral processing in the curve direction is performed according to the expressions (6), (7) and (8), whereby the correction amount ΔTa is calculated as shown in FIG. 7D.

Figure 8A:
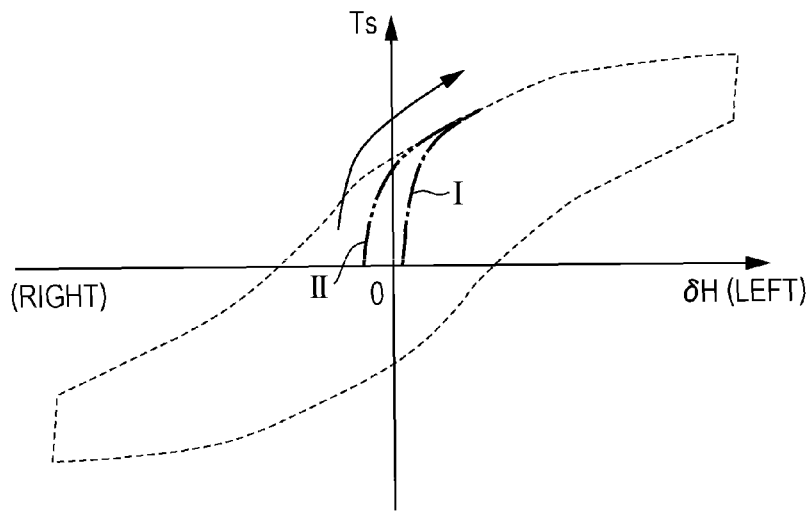
FIGS. 8A and 8B are an explanatory diagram illustrating characteristics of a steering torque with respect to a changed steering angle according to the embodiment of the present invention.

More specifically, as illustrated in FIG. 8A, at around the central position of steering, the steering system has the dead zone existing between the steering wheel angle based on the steering wheel and the actual wheels angle. For this reason, when the vehicle runs a straight path before a curve, the steering wheel angle is not necessarily zero even if the yaw rate is zero. For example, the steering angle when the vehicle runs straightly before entering into the left curve as illustrated in FIG. 7A may have any one of characteristics I (alternate long and short dash line in FIG. 8A) and characteristics II (long dashed double-short dashed line in FIG. 8A) in accordance with steering and disturbance immediately before the moment.

Figure 8B:
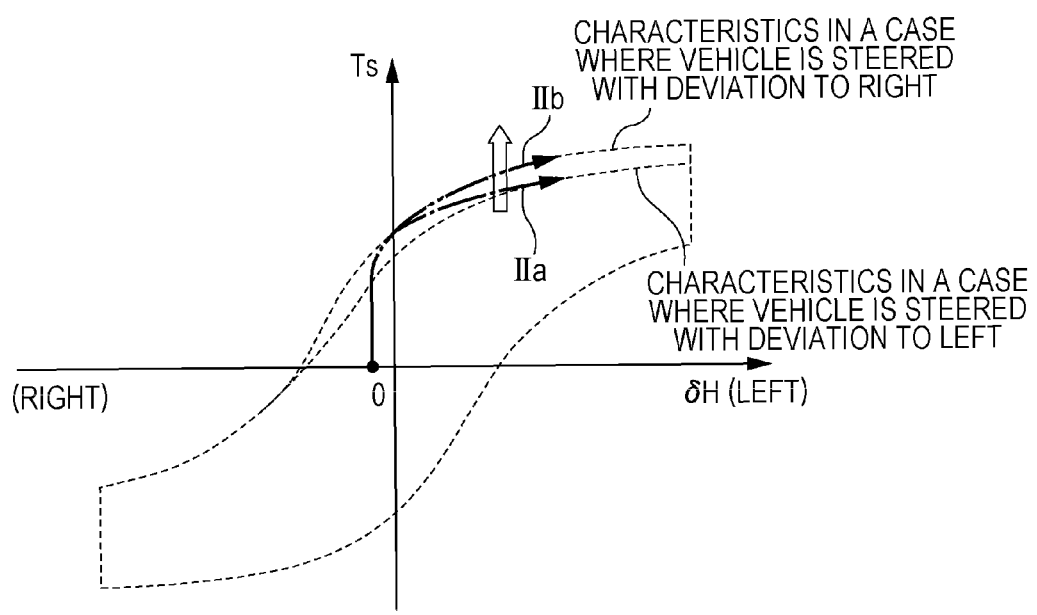

When the dead zone is deviated to the left, the steering force is lost when turning left and the driver may steer the steering wheel 4 too much as indicated by characteristics IIa (alternate long and short dash line) in FIG. 8B. At this occasion, if it is known in advance that the steering wheel 4 is turned left, the state of the characteristics of steering with deviation to the right is realized as indicated by characteristics IIb (long dashed double-short dashed line) in FIG. 8B.

In other words, when the vehicle runs straightly and the assist torque is offset in such a range where the steering wheel and the actually steered wheels are not moved, the dead zone in which neutral steering is maintained is offset to the right or the left while the dead zone width is not changed. In this state, if the driver corrects the steering angle in order to keep on going straightly, the dead zone width for straight driving in which neutral steering is maintained is reduced. In general, from the view point of ergonomics, a person is not good at relieving the force rather than applying the force. Therefore, by correcting assist torque with the correction amount ΔTa for the basic assist torque, correction is made to change from the characteristics IIa to the characteristics IIb, whereby the dead zone at the central position of the steering is reduced so as to reduce driver's steering for returning the steering wheel during steering, and this reduces the driver's burden during driving, and allows the driver to correct the steering angle with less awkwardness in such a manner that the driver feels the same feeling no matter in which direction the driver turns the steering wheel from the straight path.

In the present embodiment, the non-steered straight state determination value calculation unit 22c calculates the non-steered straight state determination value Dj, and compares the non-steered straight state determination value Dj and the constant Ct2 (see the expressions (9) and (10), thus capable of determining the straight state before turning the steering. Alternatively, this may be determined based on an operation for turning on a turn signal switch.

The present invention is correction control of the assist torque when the vehicle moves from a straight path to a curve, and therefore, for example, the correction of the assist torque may be prohibited when the absolute values of the yaw rate and the lateral acceleration are more than threshold values defined in advance.

The invention claimed is:

1. A power steering controller for a vehicle comprising:
a basic assist torque setting unit to set an assist torque of a steering torque as a basic assist torque in accordance with a driving state of the vehicle;
a driving road shape recognizing unit to recognize a shape of a driving road in front of the vehicle;
an assist torque correction unit, when the vehicle is in a straight travel state before a driver turns a steering wheel, to calculate a correction amount of the basic assist torque on the basis of a curve radius of the driving road in front of the vehicle and a steering speed, and to offset a steering torque characteristic value, which is predetermined depending on a steering angle, in a direction opposite to a steering direction by decreasing an absolute value of the basic assist torque for the steering direction based on the correction amount, the steering torque characteristic value being offset in a dead zone existing between an actual wheels angle and a steering wheel angle of the steering wheel when the steering wheel is around a central position; and
a steering control unit to drive and control an actuator that assists a steering torque with the corrected basic assist torque.

2. The power steering controller for a vehicle according to claim 1, wherein the assist torque correction unit prohibits the decreasing of the basic assist torque when absolute values of at least one of a yaw rate and a lateral acceleration is more than a predefined threshold value.

\* \* \* \* \*